Sept. 26, 1950      A. J. THIEL      2,523,790
TRAILER CHASSIS
Filed April 10, 1947      3 Sheets-Sheet 1
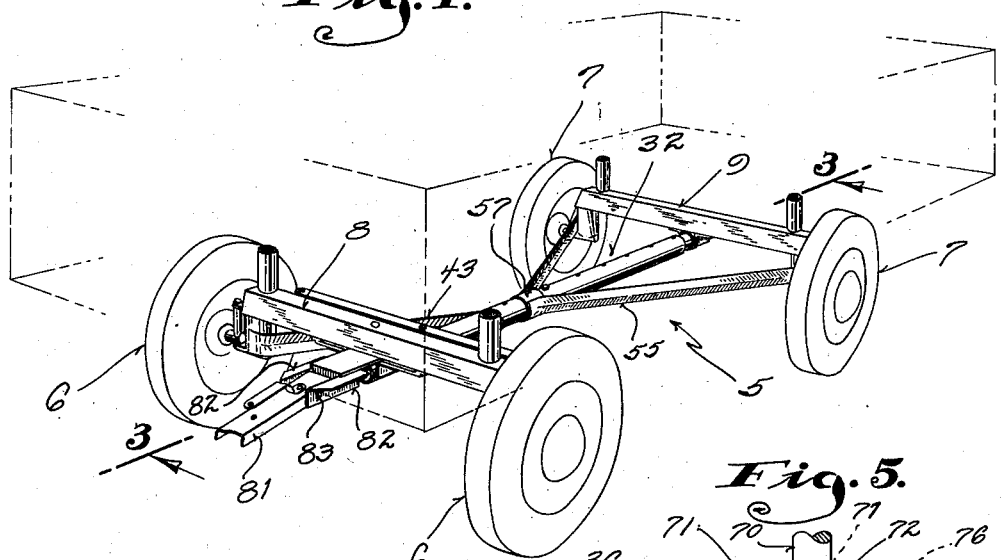
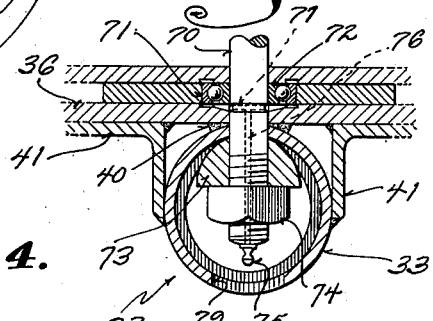
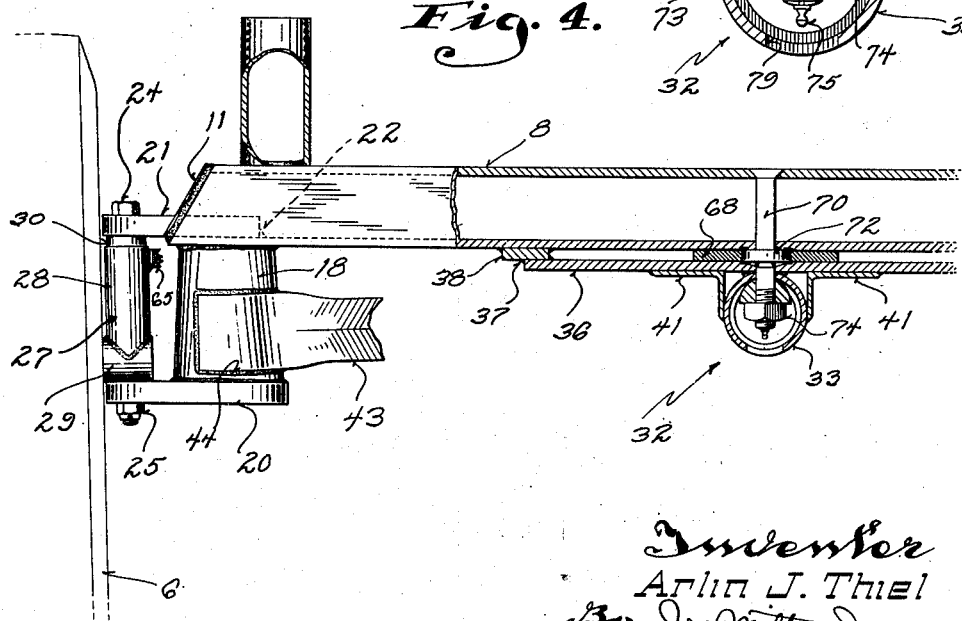
Inventor
Arlin J. Thiel
By Ira Milton Jones
Attorney Sept. 26, 1950          A. J. THIEL          2,523,790
TRAILER CHASSIS
Filed April 10, 1947          3 Sheets-Sheet 2
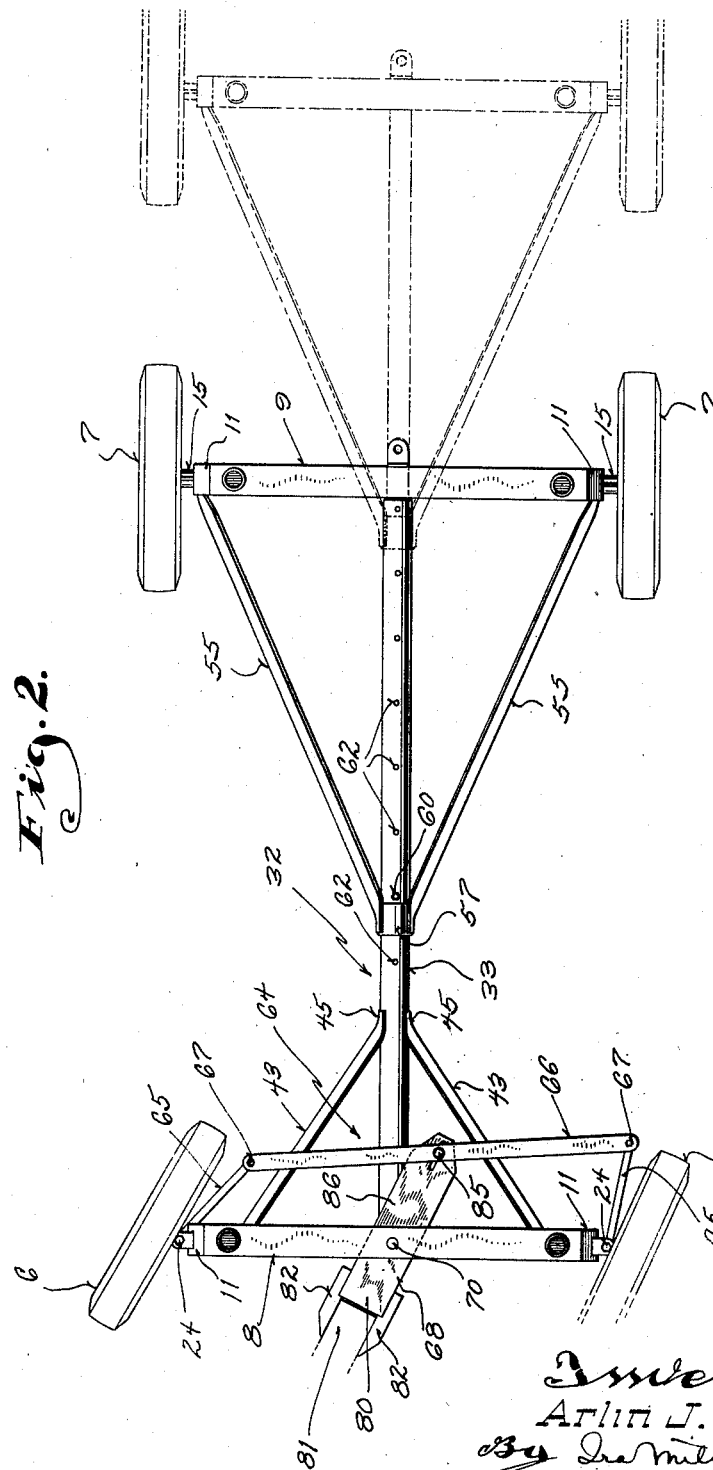
Inventor
Arlin J. Thiel Sept. 26, 1950     A. J. THIEL     2,523,790
TRAILER CHASSIS
Filed April 10, 1947     3 Sheets-Sheet 3
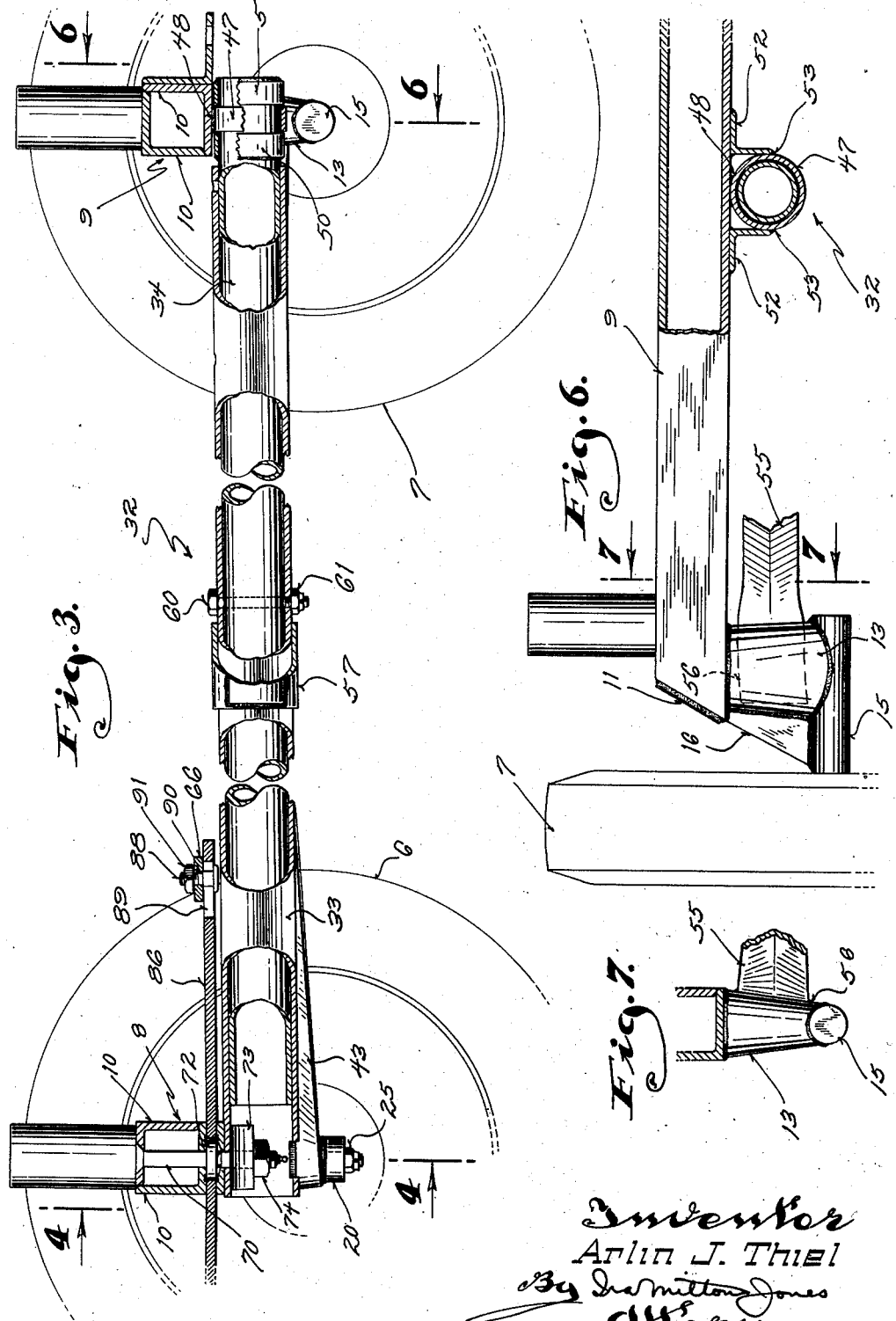

Patented Sept. 26, 1950

2,523,790

UNITED STATES PATENT OFFICE 2,523,790

TRAILER CHASSIS

Arlin J. Thiel, Shawano, Wis.

Application April 10, 1947, Serial No. 740,619

2 Claims. (Cl. 280—33.55)

This invention relates to four-wheel trailer constructions and refers more particularly to improvements in the chassis for such trailers.

One of the main objects of this invention resides in the provision of an efficient but inexpensive trailer chassis which is exceptionally well suited for farm use and which is capable of accommodating wagon boxes and platforms of a variety of sizes and shapes.

Another object of this invention resides in the provision of an improved four-wheel trailer chassis having extensible reach means by which the wheelbase of the chassis may be readily shortened or lengthened to accommodate platforms or wagon boxes of different sizes.

A further object of this invention resides in the provision of a trailer chassis of the character described which is adapted to be drawn behind a power propelled vehicle and which includes novel steering mechanism actuated by the tongue by which the chassis is drawn so as to enable the chassis to follow behind the vehicle drawing same when turns are being made.

Still another object of this invention resides in the provision of a trailer chassis of strong, all welded construction.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a perspective view of the trailer chassis of this invention illustrating how a wagon box, indicated in construction lines, is adapted to be mounted thereon;

Figure 2 is a plan view of the trailer chassis of this invention indicating, in construction lines, how the rear wheels of the chassis may be moved back from the front wheels to lengthen the wheelbase;

Figure 3 is an enlarged longitudinal sectional view through the chassis taken on the plane of the line 3—3 of Figure 1;

Figure 4 is a front elevation of the trailer chassis taken along the line 4—4 of Figure 3 and illustrating the front bolster construction, parts of the structure being broken away and shown in section to better illustrate the arrangement of parts;

Figure 5 is an enlarged detail sectional view of a portion of the bolster shown in Figure 4, illustrating the manner in which the reach member and the steering plate are connected to the bolster;

Figure 6 is a rear elevational view taken along the plane of the line 6—6 in Figure 3, and having portions broken away to better illustrate the rear bolster construction; and Figure 7 is a cross sectional view through the rear bolster taken on the plane of the line 7—7 in Figure 6.

Referring now more particularly to the accompanying drawings in which like numerals indicate like parts, the numeral 5 generally designates the trailer chassis of this invention. The chassis is here shown provided with a pair of front wheels 6 and a pair of rear wheels 7. The front and rear wheels of the chassis are carried by front and rear bolsters 8 and 9 respectively extending transversely between the the wheels of the chassis.

Attention is directed to the fact that each of the bolsters is of girder-like construction resulting from welding a pair of angle irons 10 together to form a hollow girder substantially sqauare in cross section. The opposite ends of each of the bolsters are closed by end plates 11 welded to the extremities of the pairs of angles from which the bolsters are constructed.

The rear bolster 9 has a pair of legs 13 welded to its underside and projecting downwardly from the opposite extremities of the bolster. These legs are made from short lengths of metallic tubing of a diameter not greater than the width of the rear bolster at its underside.

Cylindrical individual axle members 15 welded to the lower extremities of the legs 13 and projecting laterally outwardly therefrom toward the rear wheels 7 provide for journalling said rear wheels on a common horizontal axis which is spaced beneath the underside of the bolster a distance substantially corresponding to the lengths of the legs 13.

It will be noted that the axle members 15 are cylindrical and considerably smaller in diameter than the diameter of the legs 13, and that the lower extremities of the legs are flattened together and shaped to closely fit and embrace a substantial area of the axle members as clearly shown in Figures 6 and 7. Vertical ribs 16 may also be welded along the outer sides of the legs 13 and to the top surface of the axle members as shown in Figure 6 to lend rigidity to the connection between the axle members 15 and the rear bolster.

The front bolster 8 has a similar pair of legs 18 welded to the underside thereof at the opposite extremities of the bolster as shown best in Figure 4. The legs 18 likewise extend downwardly from the bolster to have their lower extremities disposed a substantial distance beneath the underside of the front bolster. The lower extremities of the legs 18 are cut off square to abut the flat tops of arms 20 which are welded thereto in positions projecting laterally outwardly from the legs toward the adjacent front wheels 6 of the chassis, as seen in Figure 4.

A second pair of arms 21 parallel to the arms 20 are welded to the flange of the angle iron forming the bottom of the bolster, inside the hollow interior of the bolster, as at 22, so as to be spaced a considerable distance above the arms 20. The arms 20 and 21 are parallel, and cooperate to mount a kingbolt 24 adjacent to each of the legs 18 and between these legs and the adjacent front wheels of the chassis.

The kingbolts 24 pass through suitable apertures (not shown) in the arms which locate the bolts on substantially vertical axes alongside the legs 18, and a castellated nut 25 threaded onto the lower extremity of each of the bolts to bear against the underside of the lower arms 20 anchors each of the bolts in position.

Individual axle members 27 are pivotally mounted on the kingbolts 24, and each of the axle members comprises a vertical tubular portion 28 through which the shank of the kingbolt passes, and a lower axle portion 29 of cylindrical configuration welded to the lower extremity of the tubular upright portion 28. The cylindrical portions 29 mount the front wheels 6 for rotation on substantially horizontal axes spaced well beneath the underside of the front bolster 8.

Attention is directed to the fact that the substantially horizontal axle portions 29 rest on the top sides of the arms 20, and that thrust bearings 30 encircling the kingbolts are located between the undersides of the upper arms 21 and the upper extremities of the tubular portions 28 so that the front bolster rests on the thrust bearings without interfering with pivotal motion of the front wheels about the axes of the kingbolts for steering purposes.

The front and rear bolsters 8 and 9 are joined in spaced apart relationship by means of a single, central, longitudinally disposed reach member 32. The reach member is comprised of a pair of tubular telescoping reach elements 33 and 34. In the present instance the reach element 33 has been shown as the larger of the two reach elements, and has its forward extremity disposed centrally beneath the front bolster 8, while the other reach element 34 has an external diameter to slidably but snugly fit inside the reach member 33, and has its rear extremity disposed centrally beneath the rear bolster 9.

The forward extremity of the reach element 33 which is disposed beneath the front bolster is rigidly connected therewith by being welded to the underside of a flat guide plate 36, as shown in Figures 4 and 5, and it will be noted that the plate 36 is welded to the underside of the front bolster as at 37 by means of spacer blocks 38 likewise welded to the underside of the bolster, and in a manner to dispose the guide plate in spaced parallel relationship with the underside of the front bolster for a purpose to be later described.

Inasmuch as the plate 36 is welded to the reach element 33 in substantially tangential relationship thereto, as at 40, additional rigidity for the connection between the reach element and the guide plate is afforded by welding the opposite sides of the reach element 33 to the depending flanges of spaced clip angles 41 likewise welded to the underside of the guide plate, as best seen in Figure 5.

Any tendency of the front bolster 8 to flex or oscillate about a substantial vertical axis at its connection to the reach element 33 is precluded by the provision of braces 43 having their front extremities welded to the legs 18 as shown at 44, and converging rearwardly inwardly toward the exterior of the reach element 33, to have their rear extremities disposed alongside the element 33 a distance behind the front bolster 8. These rear extremities of the braces are welded directly to the exterior of the reach element 33, as at 45.

The connection between the rear extremity of the inner reach element 34 and the underside of the rear bolster 9 is best seen in Figures 3 and 6, and provides for rocking or tilting motion of the rear bolster and the wheels thereon about the longitudinal axis of the telescoping reach elements.

This connection includes a ring 47 of a size to snugly but rotatably fit the exterior of the reach element 34, and the ring is welded to the underside of the rear bolster as at 48 in a position to receive the rearmost extremity of the reach element 34 therein. The ring 47 thus permits tilting or rocking motion of the rear bolster about the axis of the telescoping reach members, but to preclude bodily shifting of the rear bolster in the direction of the reach member axis, a pair of collars 50 are welded onto the exterior of the reach element 34 at opposite sides of the ring 47 with just enough clearance between the ring and the collars to permit free tilting of the bolster about the reach axis.

As shown in Figure 6, spaced clip angles 52 welded to the underside of the rear bolster 9 have their depending flanges embracing the ring 47 and welded thereto, as at 53, to reinforce the connection of the ring with the bolster.

Braces 55 having their rear extremities welded as at 56 to the exteriors of the rear legs 13 project forwardly in converging relationship to have their free extremities welded to a collar 57 slidably but snugly disposed on the exterior of the larger reach element 33, a substantial distance forwardly of the rear bolster 9, to provide additional reinforcement for the connection between the bolster 9 and the reach member 32. It should be noted that the braces 55, although reinforcing the bolster against wobbling about its ring connection with the rear extremity of the reach element 34, in nowise interfere with free tilting motion of the rear bolster about the longitudinal axis of the reach member 32.

Referring to Figure 3, it will be seen that each of the reach elements has a substantial length and that their lengths are so related as to provide a combined reach member of double thickness when the members are telescoped substantially their maximum distance together in the provision of a slightly foreshortened wheel base for the chassis.

The cooperating reach elements are readily locked in this position of adjustment by means of a single bolt 60 passing through aligned holes in the cooperating reach elements and a castellated nut 61 threaded on the projecting extremity of the bolt holds the same in place. Additional holes 62 may be provided in the outermost reach element 33 at a number of different spacings along the length thereof, and are adapted to be aligned with a single set of holes (not shown) in the inner reach element to afford a variety of different adjustments (telescopingly) of the two reach members for the provision of a number of different wheelbase lengths for the chassis.

In this respect attention is directed to Figure 2 wherein the rear bolster 9 and the wheels connected thereto have been shown extended to a dotted line position providing a wheelbase substantially one-third longer than that illustrated in full lines in this figure.

The trailer chassis of this invention is provided with novel steering mechanism generally indicated 64, by which the chassis is enabled to readily follow a vehicle connected thereto regardless of the direction of travel of the vehicle.

The steering mechanism 64 comprises a pair of steering arms 65, one welded to each of the tubular uprights 28 of the front axle members 27. The steering arms are located on a lever close to the underside of the front bolster 8 and extend rearwardly in converging relationship to have their rear extremities joined by a transverse link or tie rod 66 pivotally connected at its opposite ends as at 67 with the steering arms.

The tie rod 66 is held in a substantially horizontal position by its connection with the opposite steering arms and on a level substantially flush with the underside of the front bolster but a distance rearwardly thereof.

Transverse bodily motion of the tie rod 66 thus affects swinging motion of the front axle means 27 about the axes of the kingbolts 24 for steering purposes, and in order that the chassis may follow around turns executed by a vehicle drawing the same, the steering mechanism is provided with a steering plate 68 of lever-like construction. The plate 68 is relatively flat and has a thickness such as to enable disposition of the plate between the underside of the front bolster 8 and the guide plate 36.

The steering plate 68 is substantially medially pivotally connected to the front bolster by means of a pivot bolt 70 passing downwardly through the central portion of the front bolster and through a hole 71 in the steering plate, through the guide plate 36 and the uppermost wall of the reach element 33 to have its threaded extremity disposed inside the hollow interior of the element 33. The hole 71 in the steering plate 68 may be enlarged as shown in Figure 5 to accommodate a ball bearing 72 by which the plate is freely rotatably mounted on the pivot bolt 70.

The lower extremity of the pivot bolt which is disposed inside the hollow interior of the reach element 33 has a spacer 73 slipped thereover, and a nut 74 threaded on the lower extremity of the bolt to bear against the spacer is adapted to clamp the same against the inner surface of the reach element 33 and thus hold the bolt securely in place, and additionally reinforce the connection of the reach element 33 to the front bolster.

The extremity of the bolt 70 inside the reach element 33 may have a grease nipple 75 attached thereto by which grease may be injected through an axial passage 76 in the bolt opening through radial branches 77 beneath the bearing 72 to provide lubrication therefor. In this respect it will be noted that the upper surface of the guide plate 36 is relieved opposite the radial passages 77 to provide for the flow of grease outwardly from the pivot bolt to the bearing races. A hole 79 in the wall of the reach element 33 directly beneath the grease nipple 75 facilitates the attachment of a grease gun thereto for lubrication of the bearing.

The steering plate 68 has a forwardly projecting arm 80 to which a tongue or draw bar 81 is connected and by which the trailer may be drawn along at the rear of a tractor or other vehicle. Referring to Figure 1, it will be seen that the tongue 81 is received between a pair of clip angles 82 welded to the forwardly projecting arm of the steering plate, and is pivotally received on a bolt 83 passing through the depending flanges of the clip angles and through suitable holes in the tongue to provide for swinging motion of the tongue on a horizontal axis, thereby enabling the same to be connected to the tractor or other vehicle at different elevations of the forward end of the tongue.

It is important to note, however, that while the tongue is pivotally connected with the steering plate, lateral motion of the tongue imparted thereto by the vehicle in executing a turn is directly translated into pivotal motion of the steering plate 68 about the axis of the pivot bolt 70. Such pivotal motion of the steering plate is translated into steering motion of the front wheels 6 by means of a pivotal connection 85 between the rearwardly extending arm 86 on the steering plate and the medial portion of the tie rod 66.

The connection 85 between the steering plate and tie rod comprises a bolt 88 passing through a hole 89 in the arm 86 of the plate slotted in the direction of the length of the arm and hence toward the axis of the pivot bolt 70, with said bolt 88 passing through a round hole 90 in the tie rod to have its threaded extremity project thereabove as shown in Figure 3. A nut 91 threaded on the extremity of the bolt 88 secures the same in place connecting the arm 86 of the steering plate with the tie rod.

Inasmuch as the two steering arms 65 extend rearwardly in converging relationship from the front axle means 27, it follows that pivotal motion of the steering plate is translated into turning motion of the front wheels about the axes of the kingbolts through angles of different magnitude, with the wheel toward which the forward arm of the steering plate is swung turning through a greater arc than the opposite wheel. The theory of operation of the steering mechanism in this manner is well understood in the art and no further explanation thereof is deemed necessary. It is sufficient to note, however, that the entire steering mechanism is disposed at a substantial elevation above the substantially horizontal axes of the front wheels to effect maximum clearance for the underside of the trailer chassis.

From the foregoing description taken in connection with the accompanying drawings, it will be readily apparent that the all-welded construction of the trailer chassis of this invention assures maximum strength and simplicity of construction, and that the chassis is especially well suited for farm use by reason of the novel disposition of its steering mechanism, the adjustability of the wheel base thereof, and the provision of a bolster for the rear wheels capable of tilting about the axis of the single reach member.

I claim:

1. In a four-wheel trailer chassis: a front bolster extending between the front wheels of the chassis and comprising a plurality of standard structural elements fixed together to form an elongated beam of hollow rectangular cross section throughout its length; tubular legs fixed to the opposite ends of said bolster and projecting downwardly therefrom to have their lower extremities spaced a substantial distance beneath the underside of the bolster; a kingbolt for each of the front wheels of the chassis; means for rigidly mounted each of said kingbolts substantially vertically alongside one of the bolster legs and between the bolster legs and the front wheels of the chassis, said means including a lower arm fixed to and projecting laterally outwardly from the lower extremity of each of the bolster legs toward the adjacent front wheel and in which arm the lower ends of the kingbolt is anchored; and an upper arm fixed to the bottom wall of the bolster at each end thereof, said upper arm projecting outwardly in spaced parallel relation to the lower arm and having apertures therein to receive the upper portions of the kingbolts; individual tubular front axle members mounted on said kingbolts between said upper and lower arms for steering oscillatory motion about the axes of the bolts and having lateral tubular extensions at their lower ends to journal the front wheels of the chassis for rotation on substantially horizontal axes; and steering mechanism for said front wheels including bar-like steering arms fixed to said front axle members and extending rearwardly therefrom; a tie rod extending laterally across the chassis behind the bolster and pivotally connected with the outer extremities of said steering arms; and a unitary steering plate pivotally mounted on the bolster, said plate having a rearwardly extending portion connected with said rod and a forwardly projecting portion adapted to be connected with a drawbar by which the chassis may be hitched to a draft vehicle.

2. In a four-wheel trailer chassis: an elongated bolster beam intermediate the front wheels of the chassis having a rectangular cross section throughout its length; a tubular leg fixed to each end of said bolster and projecting downwardly therefrom to have its lower extremity spaced a substantial distance beneath the underside of the bolster; a kingbolt for each of said front wheels mounted substantially vertically between the bolster leg and the wheel adjacent thereto, means rigidly mounting each kingbolt including a lower arm fixed to and projecting laterally outwardly from the lower extremity of the bolster leg toward the adjacent front wheel and in which arm the lower end of the kingbolt is anchored, and an upper arm fixed to the bottom wall of the bolster at the end thereof, said upper arm projecting outwardly in spaced parallel relation to the lower arm and having an aperture therein to receive the upper portion of the kingbolt; individual tubular front axle members mounted on said kingbolts between said upper and lower arms for steering oscillatory motion about the axes of the bolts and having lateral extensions at their lower ends to journal the front wheels of the chassis for rotation on substantially horizontal axes; and steering mechanism for said front wheels including rearwardly extending bar-like steering arms fixed to said front axle members; a tie rod extending laterally across the chassis and pivotally connected with the outer extremities of said steering arms; a unitary steering plate pivotally mounted on the bottom wall of the bolster, said plate having a rearwardly extending portion having a slotted connection with said rod and a forwardly projecting portion adapted to be connected with a drawbar; a guide plate secured to the bolster and spaced from the bottom wall thereof a distance substantially equal to the thickness of the steering plate whereby the steering plate is constrained to pivotal movement; and a pivot bolt held by the guide plate and bolster members for providing a pivot for the steering plate therebetween.

ARLIN J. THIEL.

REFERENCES CITED

The following references are of record in the file of this patent:

UNITED STATES PATENTS

| Number | Name | Date |
|---|---|---|
| 1,277,890 | Evans | Sept. 3, 1918 |
| 1,426,155 | De Vol et al. | Aug. 15, 1922 |
| 1,822,178 | Thoen | Sept. 8, 1931 |
| 1,886,722 | Oppenheim | Nov. 8, 1932 |
| 2,059,419 | Tuft | Nov. 3, 1936 |
| 2,190,300 | Van Zeeland et al. | Feb. 13, 1940 |
| 2,284,892 | Persinske | June 2, 1942 |